(12) United States Patent
Burnham

(10) Patent No.: US 8,579,227 B2
(45) Date of Patent: Nov. 12, 2013

(54) VERTICAL AND HORIZONTAL FLIGHT AIRCRAFT "SKY ROVER"

(76) Inventor: J. Kellogg Burnham, Chula Vista, CA (US)

( * ) Notice: Subject to any disclaimer, the term of this patent is extended or adjusted under 35 U.S.C. 154(b) by 284 days.

(21) Appl. No.: 12/931,033

(22) Filed: Jan. 24, 2011

(65) Prior Publication Data

US 2012/0187236 A1    Jul. 26, 2012

(51) Int. Cl.
*B64C 29/00*    (2006.01)

(52) U.S. Cl.
USPC .......................................... 244/12.5

(58) Field of Classification Search
USPC ............. 244/12.6, 12.1, 12.3, 12.5, 13, 23 R, 244/23 B, 23 D
See application file for complete search history.

(56) References Cited

U.S. PATENT DOCUMENTS

| | | | | |
|---|---|---|---|---|
| 3,901,463 | A * | 8/1975 | Kovacs | 244/12.6 |
| 4,709,879 | A * | 12/1987 | Stafford | 244/12.1 |
| 4,726,546 | A * | 2/1988 | De Angelis | 244/12.6 |
| 4,828,203 | A * | 5/1989 | Clifton et al. | 244/12.3 |
| 5,454,531 | A * | 10/1995 | Melkuti | 244/12.6 |
| 5,873,545 | A * | 2/1999 | Kapin et al. | 244/12.3 |
| 5,890,441 | A * | 4/1999 | Swinson et al. | 244/12.3 |
| 6,892,979 | B2 * | 5/2005 | Milde, Jr. | 244/12.3 |
| 6,974,106 | B2 * | 12/2005 | Churchman | 244/12.6 |

* cited by examiner

*Primary Examiner* — Tien Dinh
*Assistant Examiner* — Keith L Dixon

(57) ABSTRACT

Novel aircraft for vertical and horizontal flight having powered air acceleration means installed within its structure drawing air thereinto and delivering the resulting airflow upon airfoils installed in opposed pairs on opposite sides of its exterior structure thereby producing lift without forward travel of the aircraft.

1 Claim, 6 Drawing Sheets

VERTICAL AND HORIZONTAL FLIGHT AIRCRAFT "SKY ROVER"

This patent application claims priority based on related Provisional Patent Application No. 61/336,402 filed on date Jan. 20, 2010, Confirmation No. 1099 by J. Kellogg Burnham.

BRIEF DESCRIPTION OF THE INVENTION

This application describes a novel aircraft, herein called Sky Rover, which is capable of vertical take off and landing, and hover, as well as level flight and maneuver. Sky Rover produces its own airflows within its structures and applies them to its external airfoils mounted on both sides of its structure, thereby generating lift on the airfoils, without needing forward movement of the aircraft, and finally discharging the airflows outboard to both sides; because of its vertical and horizontal flight capacity it possesses unequaled free access to the natural environment.

BACKGROUND AND FIELD OF THE INVENTION

Atmospheric flight is currently achieved by different machines which use any of a great variety of flight means. Today airplanes and helicopters carry passengers and cargo in massive volume.

A century of development has taken the Wright Brothers' stroke of genius in aerodynamics to remarkable advances: a wing so light the craft can fly on sunlight; a far-ranging killer drone; the massive industrial transport institution.

Airplanes obtain their support, when airborne, from their wings which traverse relatively stationary true air while being tilted up at their respective angle of attack, such as 15°, and the curved aerodynamic shape of their wings at that slant produces the needed upward lift. The steeper the upward tilt of the wing leading edge, the greater the lift, for a given airspeed; but at less than obligatory airspeed, different for each case, the airplane stalls, falls. With increasing angle of attack, along with increased lift there comes increasing drag, which is undesirable for airplanes, lift-drag is of no effect on stationary airfoils, specifically for Sky Rover; and Sky Rover employs steep angles of attack of 60° to 100° to get high lift, which light airplanes cannot do.

It is a safe, easy-flying, responsive talented new aircraft essentially independent of its surroundings and of atmospheric changes, an aircraft that is airborne and airworthy from the first instant of flight, an aircraft able to soar freely like a bird. Research began with conventional airfoils which gave a mild response to increasingly powerful airflows, which were sometimes combed and retarded with straighteners. Steeper angles of attack, guides, scoops, panels, slotted airfoils were used in different experiments, obtaining encouraging results.

Also developed were propellers with long reverse nose cones and a matching conical shell giving concentrated airflow, which are indeed promising, being lighter and smaller than centrifugal blowers. Effective aerodynamic lift of over 40 lbs. per sq. ft. of airfoil has been reached, an exceptional ratio, believed to be adequate to put to work. Official record of the whole process must be made so it can be of general use, on its merits.

The airplane wing is problematical. Although supported at one end, the unsupported distal end may be of structural concern. In contrast, Sky Rover uses short robust airfoils built above roof level close to the fuselage and swept by a precise airflow. Likewise, Sky Rover needs no preliminary runway dash to get into supporting air; Sky Rover is fully airborne from the first second of lift-off until it touches down at its exact landing place.

Sky Rover is a part of Aviation in general, and more particularly of heavier-than-air craft; specifically Sky Rover relates in the first instance to an air vehicle for one or more persons, and more generally to the expanded performance possibilities it presents. For Sky Rover provides new close-up access to the environment of the air; the contributions include:

a) Sky Rover becomes airborne when vertically lifted by its airfoils, with or without horizontal travel; thus VTOL;
b) Sky Rover when airborne possesses inherent upright stability, independent of movement,
c) Sky Rover, having an efficient oblong shape, and being unencumbered by the traditional transverse airplane wing, possesses a reduced beam dimension which is advantageous for its broad scope of activity.
d) Sky Rover, having self-powered flight, can go where conventional aircraft, captive to an obligatory airspeed and to a restricted horizon, may not; Sky Rover can stop in mid-flight, turn, reconsider, land or not land, depart or arrive vertically; explore; go almost everywhere; serve new functions.

GENERAL DESCRIPTION OF THE INVENTION

The invention, VTOL wingless Aircraft "Sky Rover", comprises the patentable characteristics thereof and of the components which contribute to its ability to take off vertically, fly, hover, land vertically, and perform forward flight and maneuver. Sky Rover is "wingless" to avoid confusion, because its airfoils perform functions distinct from those of the airplane wing, but the airfoils do provide support in air for Sky Rover.

When the throttle-regulated lift, generated by airflow sweeping over and under its airfoils, exceeds the weight of Sky Rover, it rises, and when lift is less than aircraft weight, it descends. Since the lift is generated upon two opposed airfoils, or two opposed banks of airfoils, which airfoils stand higher than the center of gravity of the aircraft, the lift provides a stable upright position. Sky Rover can go where other aircraft can: but, having no need of forward travel to remain airborne, Sky Rover has unique access to the very ample environment reachable from the air. Being disencumbered of the usual transverse wing of airplanes, Sky Rover has a favorable overall beam dimension, for forward flight and varied activities.

Now a new dimension is added by Sky Rover which is the subject of the present patent application, an intensifier that multiplies and simplifies flight, the Sky Rover Flight System, which provides smaller and protected airfoils, able to generate greater lift. And lift is the essence of aviation.

The two-seater class of light airplanes today can generate five to ten lbs of lift for each square foot of its wing area but my present prototype Sky Rover, in the same weight class, lifts over four times as much—40: lbs per square foot of airfoil, about the same proportionate lift as the F22. And Sky Rover lifts 500 lbs. and flies on 20 HP per unit: my next prototype with 4 airfoils will lift 2000 lbs. and only weigh 700 lbs, dry weight.

There is more. Sky Rover can fly straight up, from the ground, a standing start. Sky Rover provides its own wind and serves its own airfoils, so it does not depend so much on flying weather. Sky Rover can take off, fly, and land vertically in near-zero visibility. And vertical access enables Sky Rover to go anywhere, hover under bridges to repair them, do rescue over floods, Sky Rover is the first aircraft to produce its own airflow and serve the airflow to its own high-lift airfoil. Sky Rover can fly standing still or go anywhere; it is not subject to a compulsory airspeed under threat of stall. Sky Rover can land on water or muskeg, it is able to take on tough jobs not doable before.

Sky Rover the prototype aircraft is mostly fuselage, having cockpit forward, tail structure aft, optionally with pusher-prop; amidships the structure encloses the power source driving the blowing means, consisting of powered centrifugal blowers, which produce the airflow that enables Sky Rover to fly; the airflow is delivered to opposed pairs of airflows installed on opposite sides of the aircraft structure; the shape and dimensions of Sky Rover may vary according to the particular work it does, based on this outline.

A controlled airstream going out through each wall opening, and sweeping over the respective airfoil from leading edge to trailing edge, and to its flap if any, passing above and below the airfoil, generates a lift effect upon the airfoil. The intensity of each airstream can be varied to increase or decrease the amount of lift, as control operation may require.

IN THE DRAWINGS

FIG. 1 is a perspective view of the aircraft.
FIG. 2 is a schematic angular view of the aircraft.
FIG. 3a is a schematic view of assembly of airfoils and surfaces.
FIG. 3b is a schematic view of assembly showing routes of passage of Airflows.
FIG. 4 is a vertical schematic cross section of Sky Rover showing assembly and function of parts.
FIG. 5 is an angular side view sketch of location of airfoils and panels.

DETAILED DESCRIPTION OF THE INVENTION

Sky Rover is a novel aircraft because it rises and descends vertically, and hovers, in addition to forward flight and maneuver; also because it does not have outstretched wings but only modest airfoils at its midriff, which supply its support in air; it is novel also because it provide its own airflows which it delivers to its own airfoils to generate lift; and which, when in the clutch of moderate air turbulence, will continue to generate its own lift; because it draws in atmospheric air to produce its airflows: no atmospheric disturbance reaches the airfoils; it generates its own lift, and flies; and because it can land on water or any moderately coherent surface; and perhaps most important of all its novelties, it can perform under many flying conditions and locations, a random or regular services of inspection, repair, delivery, search, lift-saving, and emergency.

The Airfoil

Numbered reference to FIG. 3a and FIG. 5, following.

The airfoil of Sky Rover consists of two members, as shown in FIG. 3. The main body of the airfoil is Fatwing 14; but the leading edge and the whole front portion of the airfoil is severed from Fatwing 14 to provide an intervening airflow channel, called Slot Passage 13. which extends across the full span of Fatwing 14. This leading portion is separately identified as Scion 9. The airflows pass over them as if they were a single composite airfoil; but the two separated airfoils also have separate respective functions, and the Slot Passage 13 plays its own role between the two airfoils, as illustrated in part in FIG. 3. Fatwing 14 has thickness equal to 30% of its length; and when grouped with Scion 9, as composite airfoil, its thickness is greater. The overall chord times span gives the basic airfoil area. Further information about and description of the composite split airfoil Fatwing 14/Scion 9 is provided below, and in Claims.

The following discussion concerns the route that airflows take to pass through Sky Rover flight system.

Route of the Airflow Sequence

See FIG. 3

1. BLOWER INLET
2. BLOWER
3. BLOWER OUTLET
4. BLUE SKY
5. BACKBOARD
6. JACK-KNIFE-BEND
7. TECHO
8. Orifice at TECHO END
9. Upper Camber of Airfoil SCION
10. Orifice at end of Airfoil SCION
11. Concave Face of Airfoil SCION in SLOT PASSAGE
12. Leading Edge of Airfoil SCION (Nose)
13. Entry into SLOT PASSAGE
14. Upper Camber of Airfoil FATWING
15. Trailing Edge of Airfoil FATWING
16. Lower Camber of Airfoil FATWING
17. Airfoil tail, to attach aileron to Airfoil FATWING
PRIME AIRFLOW (a)
SECONDARY AIRFLOW (b)
TERTIARY AIRFLOW (c)

Airflow

Numbered reference to FIG. 3b and FIG. 3a, following.

Sky Rover is able to fly by virtue of its airfoil and airflow system, which is an object of claims of the present patent application. The airflow can be produced by any suitable air-moving means, and is here preferably provided by centrifugal blower having its rotor composed of forward-curved blades, drawing in air at both its ends and accumulating the accelerated air in its spiral volute. The air delivered by the blower has been uniformly accelerated, but is not uniform because air proceeding from the volute is retarded, and because the middle of the rotor accelerates air more; the air discharged from the Blower 3 volute spreads and scatters, and varies widely in velocity, unlike the "true" placid air traversed by airplane wings, thus precluding close equivalence between Sky Rover and airplanes in considering respective Angles of Attack; however, the airflow above described is suitable feed for the Sky Rover Lift System, herein set forth with reference to FIG. 3.

Numbered references are to FIG. 3a, and to "Route of the airflow," following.

The mixed airflow tumbles upward from Blower Outlet 3; and out of this air supply Sky Rover system produces three currents: the Prime Airflow (a), which is the main airflow; the Secondary Airflow (b); and the Tertiary Airflow (c). The total airflow is discharged upward from Blower Outlet 3 at angles between about 100° and 75° above the horizontal. The rising Prime Airflow (a) sweeps up Backboard 5; Backboard 5 has sideboards—not shown—to enclose all the airflow on 3 sides. Vertical Panel Backboard 5 at its upper end engages the adjoining end of horizontal panel Techo 7. Prime Airflow (a) races up vertical Backboard 5 and strikes horizontal Techo 7 and is trapped; Prime Airflow (a) immediately goes through a right-angle change of direction, presumptively the area Jack-Knife-Bend 6; Prime Airflow (a) then flows horizontally under panel Techo 7 to the Orifice 8 located at the distal end of Techo 7, and passes forward bursting into the area of Blue Sky 4. There is no further cover over Prime Airflow (a) all the way to the Trailing Edge 15 of Fatwing 14.

As Prime Airflow (a) moves forward under Blue Sky 4, it is impacted from below by Secondary Airflow (b) riding up the upper Camber 9 of Scion 9 at Orifice 8. And shortly beyond, Prime Airflow (a) is again impacted underneath by Tertiary Airflow (c) rising through the narrow orifice at the top of Slot Passage 10. Prime Airflow (a) is pummeled and enriched by each of these impacting airflows.

We have seen that Prime Airflow (a), the strongest airflow, breaks direct from the top of Blower Outlet 3. Secondary Airflow (b), issuing from Blower Outlet 3, spreads out embracing approximately from 95° to 85° above the horizontal, striking toward airfoil Scion 9; the Secondary Airflow (b) rises up along the Scion 9 upper camber; on reaching the top of Scion 9 it impacts upon Prime Airflow (a). Since Tertiary Airflow (c) is the lower third of the airflow coming out of Blower Outlet 3; it flows toward the nose of airfoil Scion 9, and Tertiary Airflow (c) separates from Secondary Airflow (b) on striking Scion 9, Tertiary Airflow (c) passes below the nose of Scion 9; it is then exposed to entry to Slot Passage 13; and part of Tertiary Airflow (c) penetrates Slot Passage 13 and is accelerated as it rises in the diminishing space, and comes out at Orifice 10 to impact Prime Airflow (a). The part of Tertiary Airflow (c) that does not enter Slot Passage 13 continues along the lower Camber 16 of Fatwing 14 to Trailing Edge 15 where it mingles again with Prime Airfoil (a) in the atmosphere. The still energetic flow of Prime Airflow (a) as it reaches Trailing Edge 15, and the remaining Tertiary Airflow (c), can be used to advantage with a flap or elevator: this potential is not shown in FIG. 3.

Prototype

The prototype Sky Rover fuselage is six feet wide, and accommodate in its interior space a side-by-side pair of Blowers 3 which are nearly 3 feet in diameter, each Blower 3 serving its corresponding airfoil mounted on the exterior surface of the fuselage; hence the cockpit admits convenient side-by-side seating for two, with amplitude for work.

The wide fuselage slows airspeed but the absence of customary broad wingspread compensates in reduced air resistance. See FIG. 4

Balance

Sky Rover when flying is characterized by inherent and self-correcting balance. Support for the aircraft when airborne is provided by the two parallel lengthwise batteries of airfoils, which hold and carry the central structure below and between them. Much of the total weight of the aircraft is located in the lowest part of the central structure hangs below and is locked to the airfoils, like a frozen pendulum, and returns to the mid-point position of balance. Even if some phenomenon of weather or maneuver were to swing the aircraft out 90°, automatically and by gravity it will seek out and regain its balanced middle position.

The foregoing description refers preferentially to right and left, or roll, departures from and recovery of medial balance; however the same factors equally provide balance in pitch, or fore-and-aft variations, and for the same reason: that Sky Rover is balanced at center.

In fact, however, Sky Rover may have a slight but significant pitch preference, to be nose-heavy, so that it tends always to be very slightly head-down and to move forward, which is helpful for easy handling, but consistent, easily compensated for, and allowed for.

Balance Control

The automatic balancing instrument carried by Sky Rover consists of a rod suspended within a case and fitted with hair-thin springs urging it toward its vertical suspension position, having at its lower end six or other number of radially protruding wired electrodes closely surrounded by a grounded metallic ring which is fixed to the structure of Sky Rover.

Any slight change in the level position of Sky Rover actuates the suspended rod and causes the corresponding one of the electrodes (depending on the direction involved) to make contact with the grounded metal ring, closing the circuit associated with that particular electrode and causing it to actuate the corresponding element, compressed air valve or otherwise powered control assembly, and thereby to initiate the compensating operation. As the level position of Sky Rover is brought again to neutral, de-contacting the electrode involved, the power system returns to neutral.

The pilot's joystick, when initially moved from neutral position, makes selective contact with the circuits operating with the automatic balance control mechanism, independently of any imbalance detected by the apparatus; and a further movement of the joystick provides additional and stronger action for maneuver.

Power for operation of the aircraft is provided by a gasoline engine (or other suitable source). In one version of this invention the engine powers a hydraulic pump, and the pump provides oil under pressure to hydraulic motors; each hydraulic motor is coupled, directly or through gearing, propeller, turbine, centrifugal blower or other air mover; a return line from each hydraulic motor completes the circuit; thus uniform power and rotation are supplied to produce the required airflows. The hydraulic oil flow from the hydraulic pump is under governance, thus providing selective management of flight to the automatic balance mechanism above described, and to the pilot.

In other versions of this invention power is transmitted from the motor to the fans or propellers or blowers by means suited to the position, load, speed range and other factors related to the overall function and the vehicle, including provision of intermediate planetary gearing to accelerate rotation. Power transmission from engine to propeller or blowers is also feasible using sheave and belt, and by toothed belts. Similar convenience is afforded by sprocket and chain transmission. These drives require guard protection, and provision for tensioning.

ADDITIONAL COMMENTS ON DRAWINGS

The description of airfoils and airflows refers to the numbered points in the diagram of FIG. 3. Air intake on top of rear fuselage in FIG. 1 is for an intended prototype Sky Rover aircraft having four units of the same capacity shown in FIG. 3, with 80 HP, total estimated dry weight 700 lbs, total lift 2000 lb, two-seater side by side with cargo capacity fore and aft, suitable for diverse use, including lifesaving.

Backboard, Techo, Scion, Fatwing

Figure 3A:
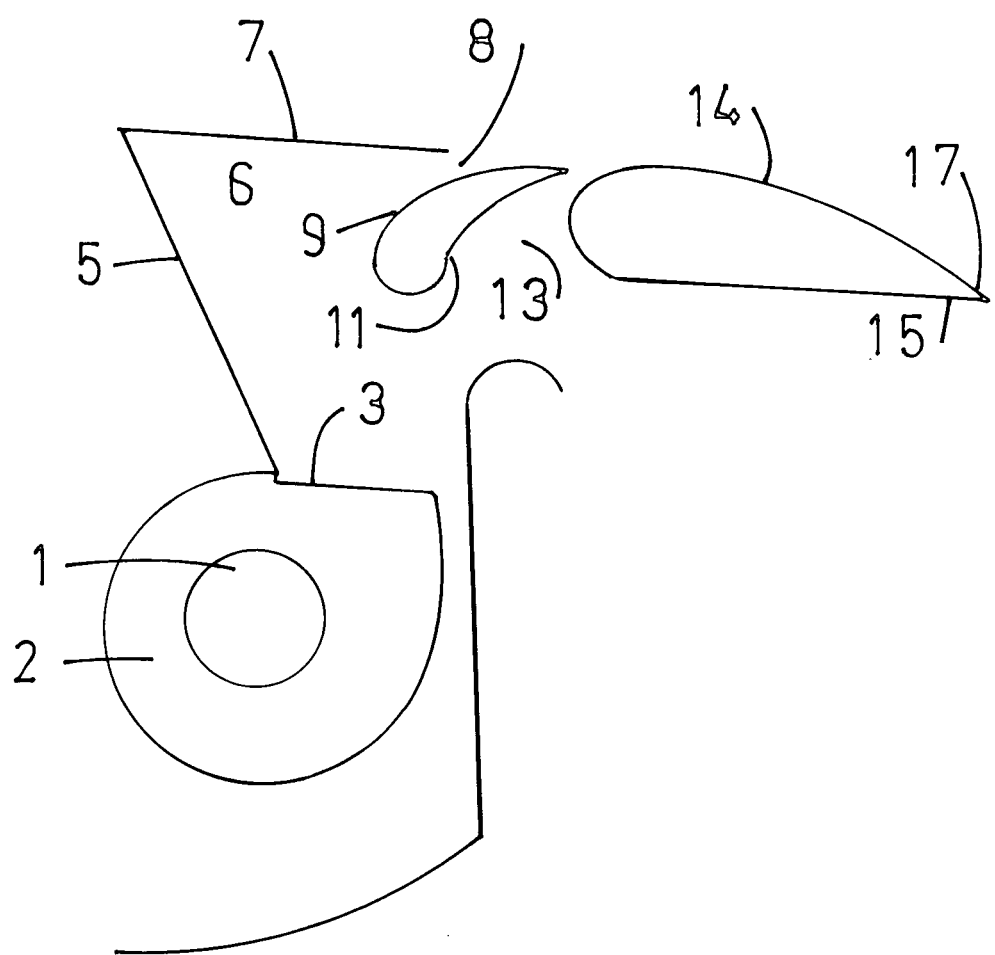
Figure 3B:
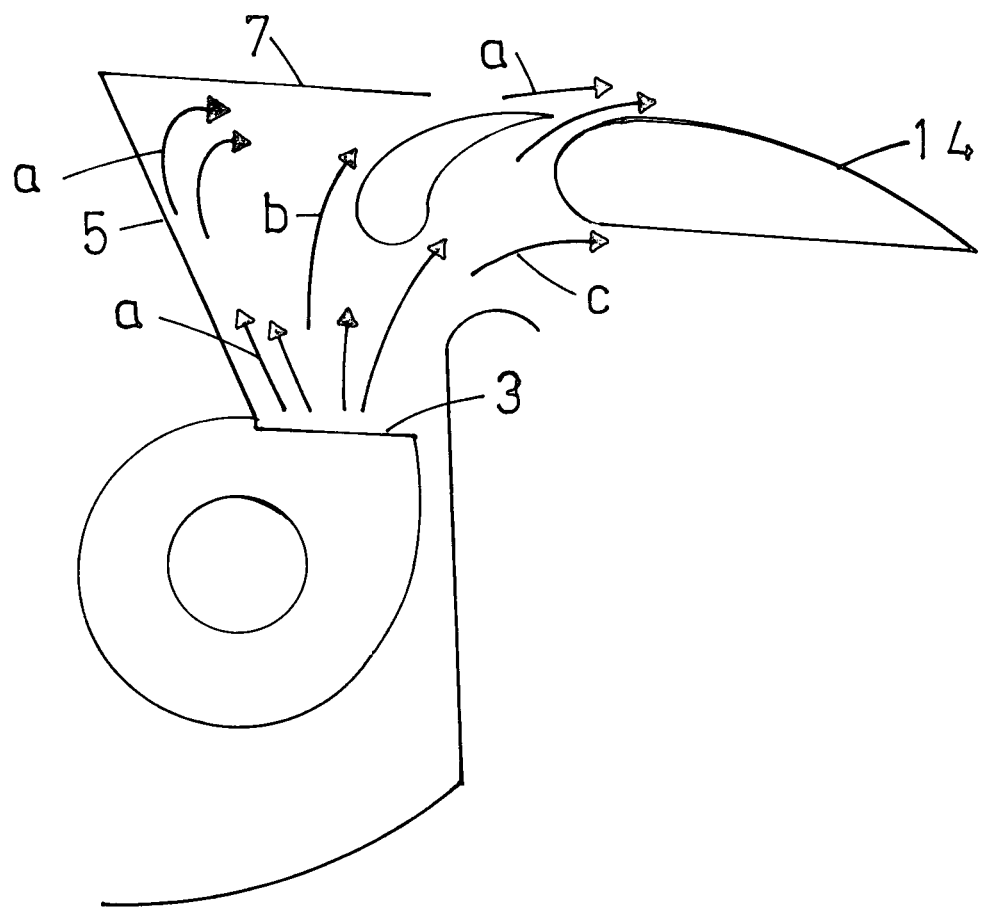

Since every patent should furnish information sufficient for the reader to reproduce the results cited, the following specifics as to successful trials are offered: FIG. 3 is diagram of one such tested lift-producing prototype having a powered blower with rotor 18⅛"ø×18⅛"; and outlet 30"×30" revolving about at 1100 rpm, consuming 16 to 20 HP, having airfoils: Scion 12"×36" and Fatwing 36"×36", shaped and spaced as shown, and having Backboard 30"×30" and Techo 35"×30"; this prototype produces 500 lbs avdp. lift at the forward third of Fatwing, or 42 lbs lift per sq. ft. of airfoil; these results being still less than the potential.

Figure 1:
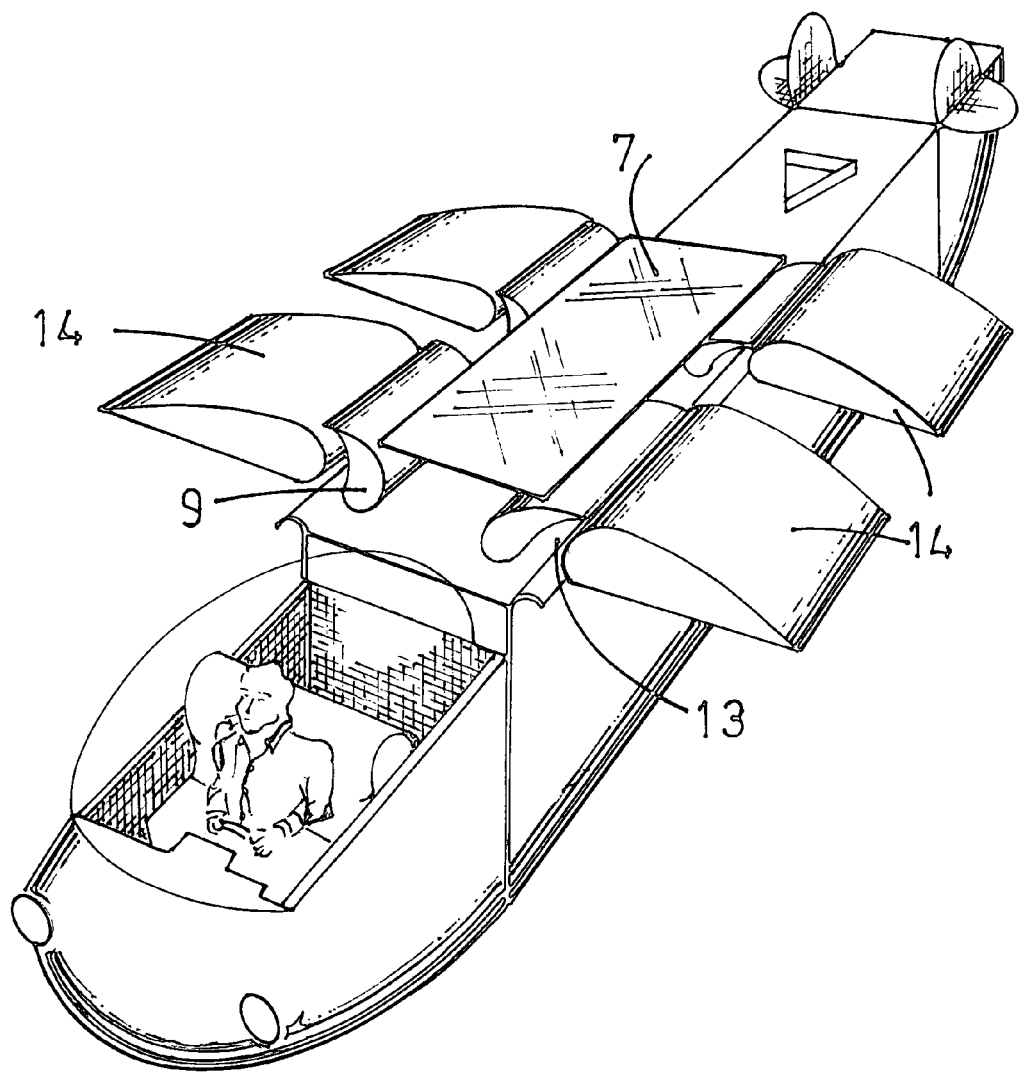

FIG. 1 depicts prototype Sky Rover 4 equipped with four units of Sky Rover flight assembly, each unit having powered 18⅛"ø blower with airflow direction and airfoils Fatwing and Scion, for total lift of 2000 lbs, showing the optional side-by-side seating cockpit, cargo or lab space, firewall, the four units of Sky Rover airfoils installed in opposed pairs, the rear fuselage air intake, and then rudders and elevators; reference FIG. 1.

Figure 2:
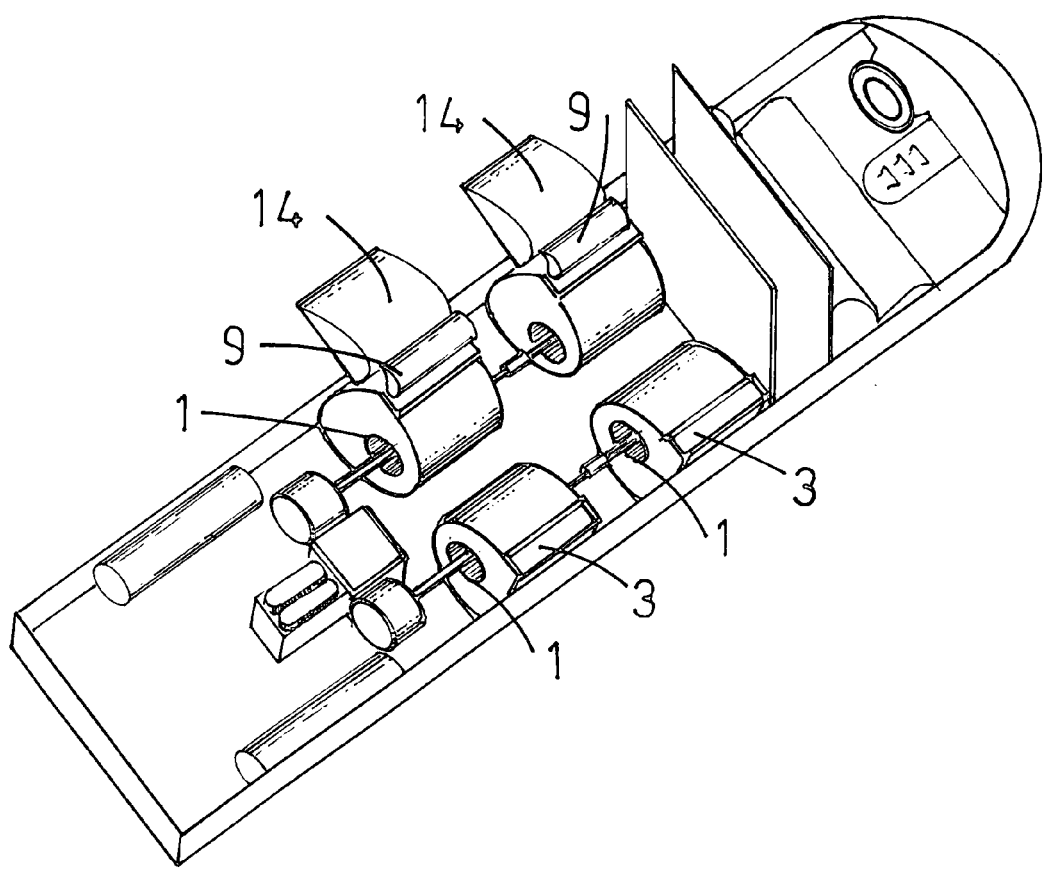
Figure 4:
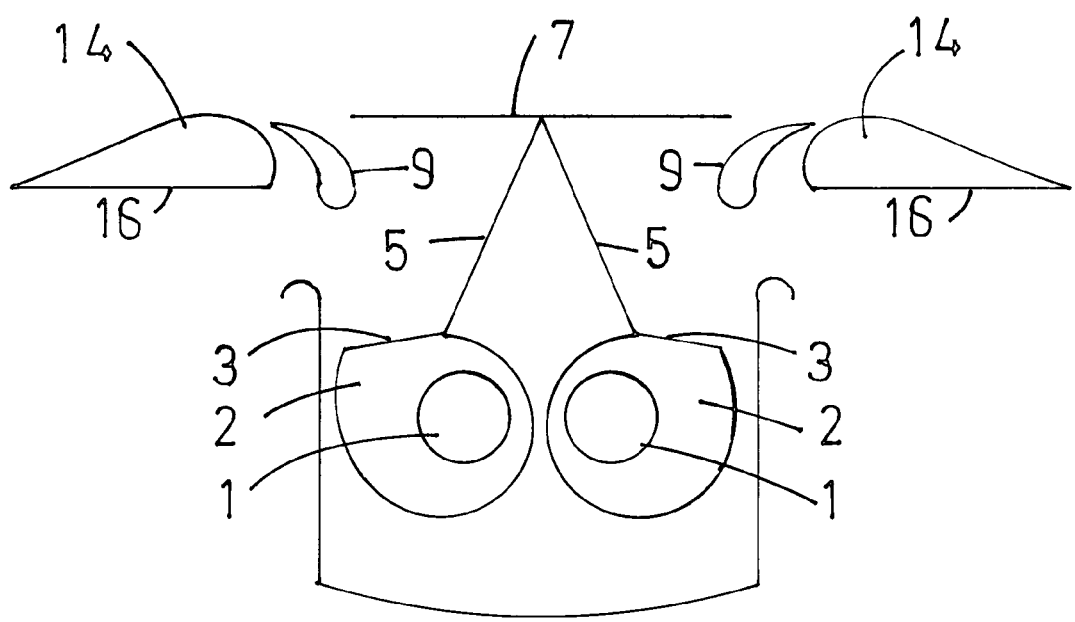
FIG. 4 shows a possible distribution of components for the suggested aircraft.

FIG. 2 depicts prototype Sky Rover 4 flight assembly as in to FIG. 1 with all four Techos removed and airfoils on right side removed, to illustrate one mode of compact grouping, the Sky Rover flight assemblies at mid-fuselage with power plant and drive partly balancing out cockpit and forward cargo load. These arrangements are optional. FIG. 4 is a vertical cross sectional view of the Sky Rover Prototype 4 of FIGS. 1 and 2. Showing 2 units mounted side by side within the fuselage reverse rotation and airflows directed to opposite sides, thus counterbalanced.

Figure 5:
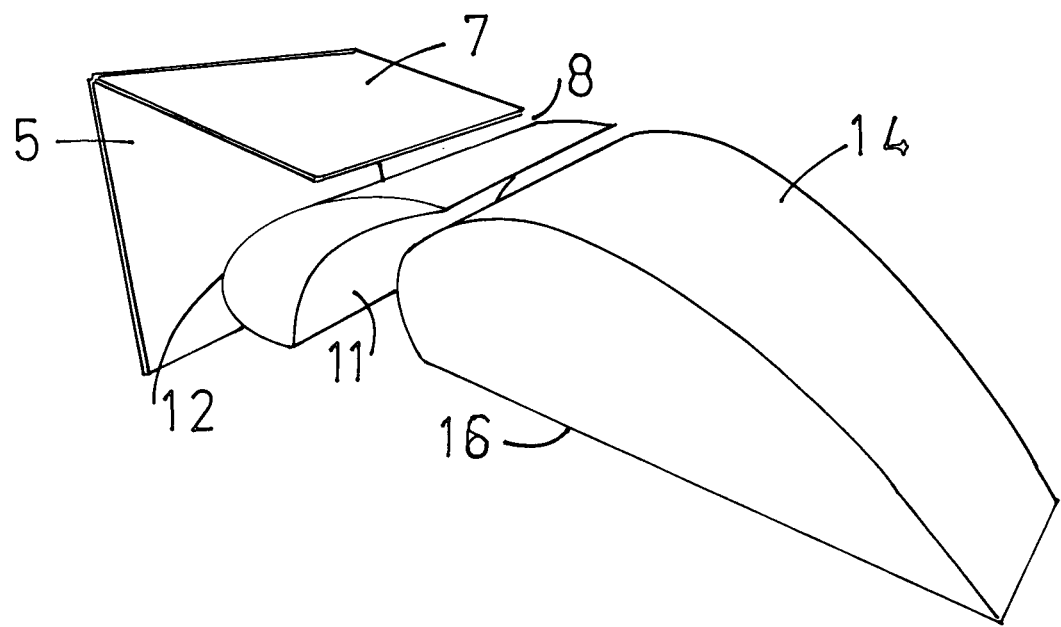
FIG. 5 shows the bare airfoil components.

The air passage area enclosed by the fuselage sides and bottom permits adequate air movement for the possible 60,000 cfm total volume which passes into end entries of the blowers; each blower outlet delivers its airflow to its respective airflow system. FIG. 5 is a sketch showing Scion 9 and Fatwing 14 in approximate position with horizontal panel Techo 7 and vertical panel Backboard 5; the terms "horizontal" and "vertical" are suggestive only.

I claim:

1. A vertical takeoff and landing aircraft, comprising:
   a plurality of airfoils attached externally to a fuselage, wherein a chord of each of said airfoils is oriented normal to a longitudinal axis of the fuselage and directed away from the fuselage on opposing sides thereof such that airflows which traverse said airfoils are likewise directed outward and away from the fuselage on opposing sides thereof;
   wherein the airflows are produced from a plurality powered blowers within the fuselage;
   a plurality of chambers defined by a backboard and a panel connected to said backboard at an angle;
   each said chamber is connected to a blower wherein at least one of said airfoils is located adjacent the chamber such that the airflows traverse across said airfoils to produce lift;
   an aileron positioned on a trailing edge of each airfoil for flight control of roll and yaw by varying the relative lift of the opposed airfoils on opposite sides of the aircraft, and;
   an aft end of the fuselage equipped with a tail structure comprising a rudder and elevators enabling a pilot to manage pitch and flight control of the aircraft.

\* \* \* \* \*